United States Patent [19]
Hao et al.

[11] Patent Number: 5,412,661
[45] Date of Patent: May 2, 1995

[54] TWO-DIMENSIONAL DISK ARRAY

[75] Inventors: Hsieh T. Hao, Los Altos; Spencer W. Ng, San Jose, both of Calif.

[73] Assignee: International Business Machines Corporation, Armonk, N.Y.

[21] Appl. No.: 957,293

[22] Filed: Oct. 6, 1992

[51] Int. Cl.⁶ .................. G06F 11/10; G06F 11/20
[52] U.S. Cl. .................. 371/10.1; 364/DIG. 1; 364/243.7; 364/246.4; 371/40.4; 371/51.1; 395/428; 395/575
[58] Field of Search ............ 371/10.1, 10.2, 40.1, 371/40.4, 51.1; 395/575, 275, 425

[56] References Cited
U.S. PATENT DOCUMENTS

| | | | |
|---|---|---|---|
| 3,725,864 | 4/1973 | Clark et al. | 340/172.5 |
| 4,993,030 | 2/1991 | Krakauer et al. | 371/40.1 |
| 5,148,432 | 9/1992 | Gordon et al. | 371/10.1 |
| 5,303,244 | 4/1994 | Watson | 371/10.1 |

OTHER PUBLICATIONS

"How Reilable is Raid?" by Martin Schulze et al; Computer Science Division, University of California Berkeley; IEEE 1989; pp. 118–123.

"A Case for Redundant Arrays of Inexpensive Disks (RAID)" D. A. Patterson et al; ACM SIGMOID Conference, Jun. 1988; pp. 109–116.

*Primary Examiner*—Stephen M. Baker
*Attorney, Agent, or Firm*—Baker, Maxham, Jester & Meador

[57] ABSTRACT

A data storage system architecture having an array of small data storage disks, organized into logical rows and columns, with each disk coupled to two disk controllers via two independent controller-disk interconnects. No two disks are coupled to the same pair of controllers. In this data storage system architecture, the component disks are arranged in parity groups of variable size. Within each parity group, failure of one disk sector can be recovered through data reconstruction using data from other disks in the parity group. One or more disks can be reserved as hot standbys for substitution on failure, automatically replacing any failing disk.

11 Claims, 4 Drawing Sheets

HETEROGENOUS PARITY GROUPS

HETEROGENOUS PARITY GROUPS

TWO-DIMENSIONAL DISK ARRAY

BACKGROUND OF THE INVENTION

1. Field of the Invention

This invention relates generally to computer data storage systems consisting of arrays of individual disks and, more particularly, to an arrangement of disks and controllers that improves data storage reliability through redundancy.

2. Discussion of the Related Art

Small magnetic disk storage devices with hundred megabyte capacities offer cost and power advantages over larger disks having capacities on the order of gigabytes. Because the smaller disks offer the same I/O bandwidth as the larger ones, several smaller disks can provide greater data bandwidth than one larger disk of equivalent capacity. Because of this advantage, computer disk subsystems that consist of arrays of small disks are desirable.

An array of n small disks, each having the same mean time between failures, $MTBF_1$, has an overall mean time between failures of $MTBF_1/n$, assuming that a single disk failure is an array failure and that disk failures in the array are statistically independent. Thus, an array of twenty small disks should fail twenty times more often than a single large disk of similar quality and technology. To overcome this problem, small disk arrays can be organized to improve reliability through some sort of redundancy, that is, by decoupling single disk failure from array failure.

Practitioners in the art propose a variety of parity schemes for error correction in a redundant array of small disks. For example, an additional disk can serve as a parity disk for each group of m data disks, so that each parity disk sector contains the "exclusive-or" (XOR) of the contents of all corresponding sectors on the m data disks. If a data disk sector fails, its contents may then be reconstructed by XORing the (m-1) other data sectors with the corresponding parity sector. Schemes of this type are disclosed in U.S. Pat. No. 4,092,732 issued to N. K. Ouchi. Similar techniques for data redundancy in disk arrays are also discussed in a paper by D. A. Patterson et al., "A Case for Redundant Arrays of Inexpensive Disks (RAID)", Proceedings of the ACM SIGMOD Conference (Jun. 1-3, 1988), pp. 109-116.

In redundant arrays of small disks, it is also well-known to reserve some disks unused in a "hot standby" mode so that they may be switched into the array to immediately replace a failing data disk without system interruption.

Disk drive and disk controller interconnection architecture significantly influences the performance and reliability of small disk arrays. Because the controllers themselves and the interconnection cabling to the disks are also subject to failure, acceptable reliability may require some form of controller and interconnect cabling redundancy as well.

M. Schulze et al. ("How Reliable is a RAID?", Proceedings of the Spring COMPCON (1989), pp. 118-123) consider controller and disk interconnection architecture in the context of the Small Computer Systems Interconnect (SCSI) Standard. They propose a scheme for organizing a redundant disk array into multiple strings of disk drives, each string having one controller and one SCSI interconnect path with a plurality of drives sharing the single controller and path. Each parity group is laid out across these strings so that no two disks within a parity group are from the same string (FIG. 1). Thus, Schulze et al. teach a scheme that allows data recovery by parity regeneration from controller or path failure because a single such failure affects no more than one disk in each parity group. However, for larger parity groups, many controllers are required, increasing costs. Schulze et al. also propose an even more costly scheme using duplicate controllers, but do not consider accompanying means for redundancy in the SCSI interconnections that join the controllers to the disks.

FIG. 2 shows an alternative disk array architecture in the related art wherein each disk drive is dual-ported, thereby being adapted for independent coupling to either of two controllers. Each of two controllers is connected to a single dual-ported disk by an independent interconnect path. The disk drives in the array are grouped into strings where each string shares the same pair of controllers. Each parity group lies entirely within a single string. With this arrangement, an entire array could lie within a single string, requiring no more than two controllers, thereby reducing cost. However, because each parity group is accessible through only two controllers, the data bandwidth advantage of such arrays is generally lost. A single controller failure could overload the remaining controller, slowing system performance to unacceptable levels.

A clearly-felt need exists in the art for a redundant disk array architecture that allows continued operation without major performance degradation when one controller fails. There is also a need for such an architecture that defines parity groups independently of controller location, so that cost/performance objectives alone determine controller numbers independently of parity group size or number. These unresolved deficiencies are clearly felt in the art and solved by this invention in the manner described below.

SUMMARY OF THE INVENTION

This invention interconnects an (n×m) array of disks with (n+m) controllers, where n and m are nonzero positive integers. A disk numbered (i,j) is connected to a controller (i) and to a controller (n+j) as shown in FIG. 3. Each controller is associated with dedicated interconnect cabling connecting it to all disks that it controls.

It is an advantage of this invention that no two disks are connected to the same pair of controllers. Thus, when one of the controllers fails, its load is distributed among several other controllers, without overloading any one controller.

It is a further advantage of this invention that the arrangement of controllers is independent of parity group assignment. This permits the array to be split among several larger and smaller parity groups, each sized according to the particular reliability requirements of the associated data class. Also, selected disks may be excluded from the parity groups in a "hot standby" mode, available for immediate substitution upon data disk failure without system interruption.

It is yet another advantage of this invention that the ratio of controllers to disks may be varied somewhat by changing the array aspect ratio (n/m), thereby responding to dynamic changes in data class characteristics.

It is a feature of this invention that it can be applied to arrays of optical data storage disks as well as arrays of magnetic data storage disks.

The foregoing together with other objects, features and advantages of this invention will become more apparent when referring to the following specification and claims and the accompanying drawing.

BRIEF DESCRIPTION OF THE DRAWING

For a more complete understanding of this invention, reference is now made to the following detailed description of the embodiments illustrated in the accompanying drawing, wherein.

DETAILED SPECIFICATION OF THE PREFERRED EMBODIMENT

Figure 1:
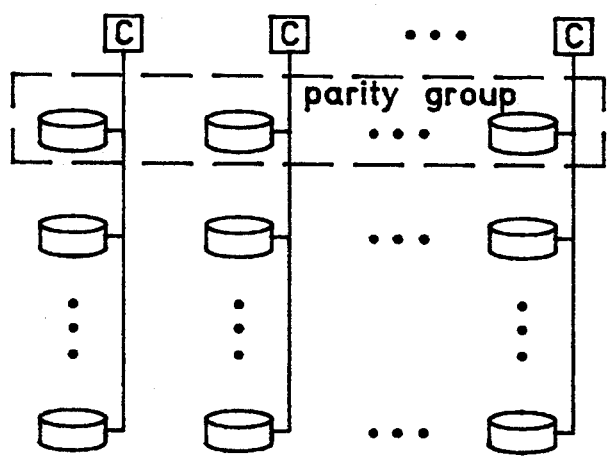
FIG. 1 shows an interconnection of disks and controllers known in the art.
Figure 2:
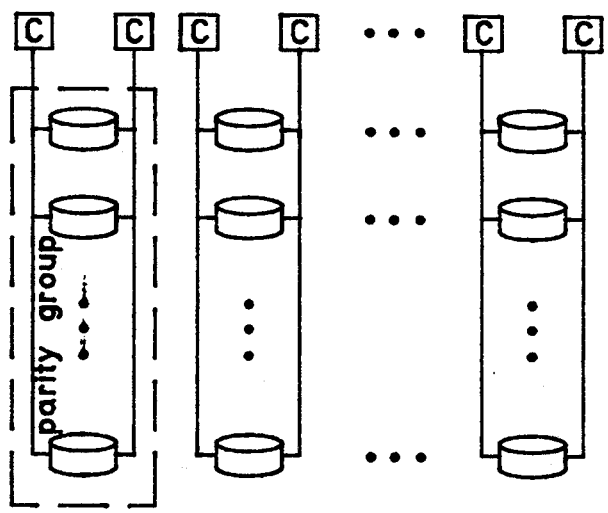
FIG. 2 shows a second interconnection of disks and controllers also known in the art.
Figure 3:
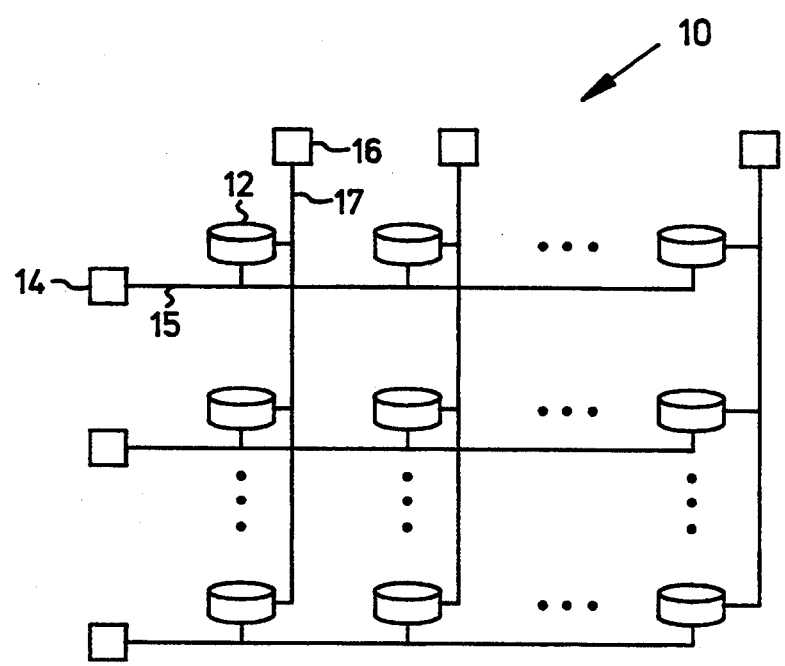
FIG. 3 depicts an illustrative embodiment of the data storage array architecture of this invention, showing disks, controllers and interconnections.

FIG. 3 shows an array 10 consisting of plurality of dual-ported disks 12, which may be either optical or magnetic storage devices. Each disk 12 in array 10 has one row index (not shown) and one column index (not shown). All disks 12 having identical row indexes are interconnected to one of a first plurality of controllers typified by controller 14 through one of a first plurality of controller disk interconnects typified by interconnect 15. Also, all disks 12 having identical column indexes are interconnected to one of a second plurality of controllers typified by controller 16 through a one of a second plurality of controller-disk interconnects typified by interconnect 17. Each disk 12 is thus connected to two disk controllers (14 and 16) through two controller-disk interconnects (15 and 17). Some or all disks in the array may be operated so that their read and write heads are synchronously positioned to the same logical location. This array organization is a purely logical arrangement and need not relate to the physical disposition of the disks.

Figure 4:
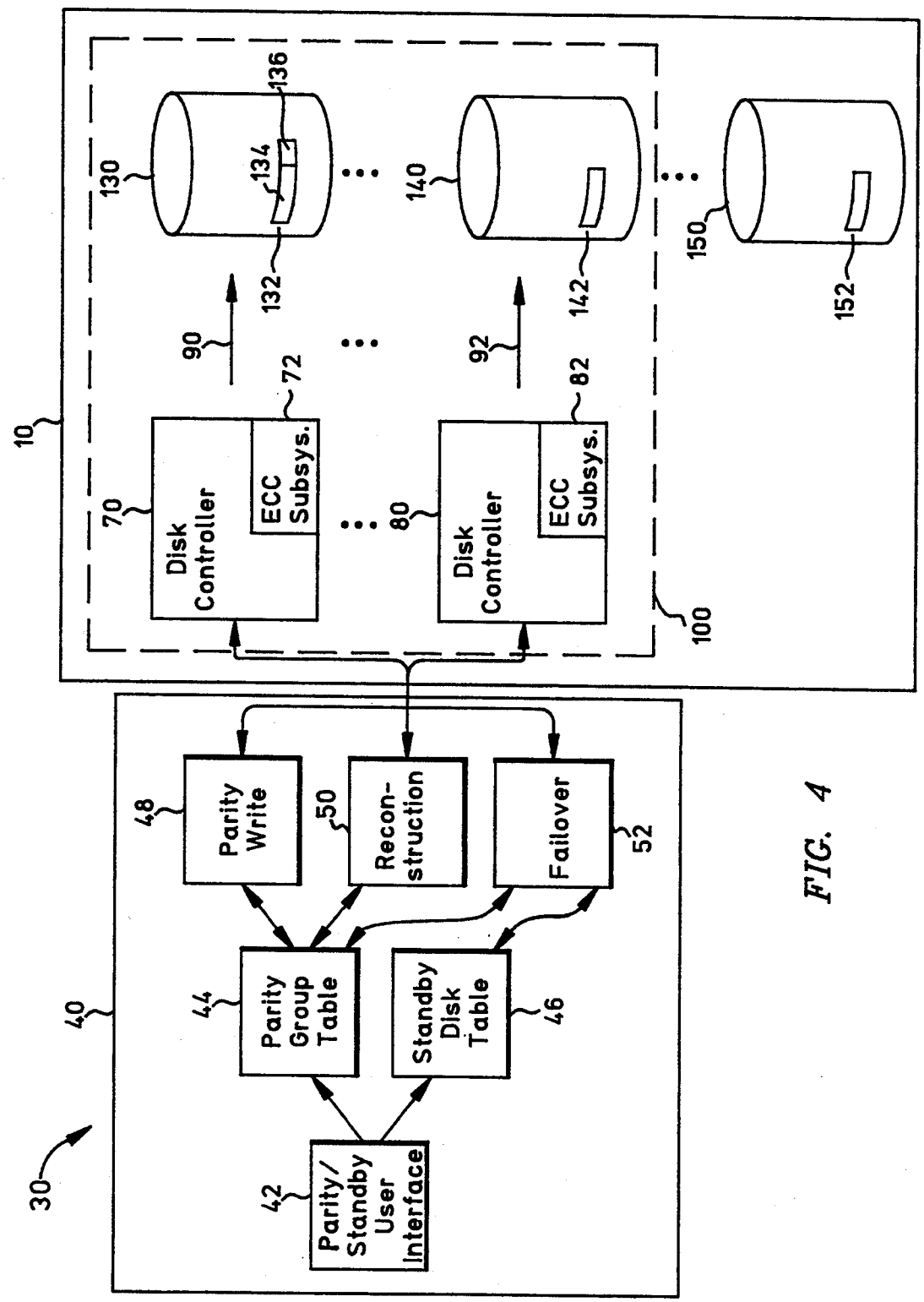
FIG. 4 provides a block diagram illustrating the array controller system of this invention.

FIG. 4 shows an illustrative embodiment of array 10 within a computer system 30 presented only to illustrate the operation of the array architecture of this invention. Array 10 includes a plurality of disks typified by disks 130, 140 and 150 and a plurality of disk controllers typified by controllers 70, 80, interconnected by a plurality of controller-disk interconnects typified by interconnects 90 and 92 as discussed above in connection with FIG. 3. A disk array controller 40 is shown coupled to array 10 in a manner that achieves fault tolerance in accordance with this invention.

Figure 5:
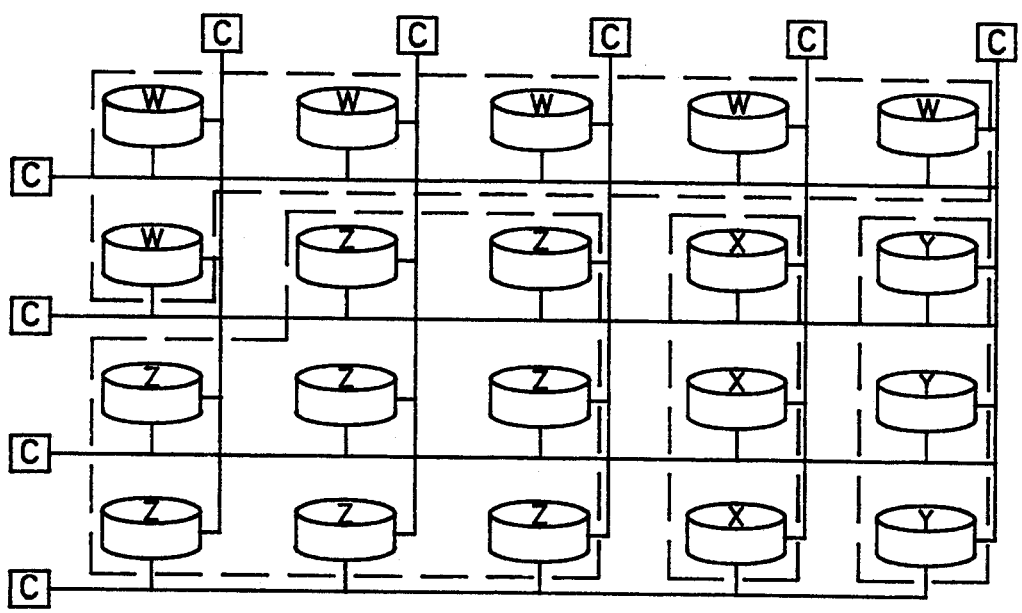
FIG. 5 depicts an alternative embodiment of the data storage array architecture of this invention showing parity groups of different sizes.

In operation, computer system 30 permits the system manager or user (not shown) to select certain disks to constitute a parity group 100 by means of a parity/-standby user interface 42. A parity group table 44 includes a list of parity groups, lists of disks within each parity group and possibly further information about each disk, e.g. an indication of whether it is being used for redundant information storage as explained below. User interface 42 updates parity group table 44, e.g. adding a new parity group to the list of parity groups or revising the list of the disks in that new parity group. As depicted in FIG. 5, different parity groups need not embrace the same number of disks, and the system manager or user (not shown) can select parity groups of different sizes. Because the MTBF of a parity group decreases as the number of disks in the group increases, a larger parity group may be more appropriate for less critical data, and such groups can by dynamically revised.

When array controller 40 executes a write to a sector 132 of a disk 130 selected into parity group 100, a parity write component 48 consults parity group table 44 to determine to what parity group, if any, disk 130 belongs. Component 48 directs that certain redundant information 142 be written to at least one disk 140 of parity group 100. Redundant information 142 for sector 132 could be, for example, the XOR (exclusive or) of the contents of the corresponding sector in all disks of parity group 100 except disk 140. Redundant information 142 may be written simultaneously to disk 140 and to disk 130 if both disks 130 and 140 are operated synchronously to read and write at the same logical location.

In computer system 30, disk failures are detected and indicated by any suitable means known in the art. For example, disk controller 70 may be provided with an error correcting code (ECC) subsystem 72. Each sector 132 of disk 130 is then assigned space for both usable data 134 and ECC information 136. Whenever controller 70 writes a sector of data to disk 130, ECC subsystem 72 computes and writes ECC information 136 corresponding to usable data 134 into destination sector 132. Likewise, whenever controller 70 reads sector 132, ECC subsystem 72 logically combines usable data 134 and stored ECC information 136 to detect errors in stored sector 132 in the manner known in the art.

Controller 70 can correct some errors by using stored ECC information 136 or by repeating the read operation. Other errors that are not correctable may indicate a persistent fault. Upon persistent error, controller 70 signals array controller 40 that sector 132 has failed. Other types of disk failure may be detected, for example, by the presence of certain electrical signals on interconnection 90, or by the repeated failure of disk 130 to acknowledge a handshake.

In FIG. 4, an indication of sector 132 failure causes controller 40 to invoke a reconstruction component 50, which reconstructs the contents of failed sector 132. The precise operation of component 50 depends on the scheme chosen for redundant data 142. If, for example, redundant data 142 is an XOR of sector contents as discussed above, reconstruction component 50 reconstructs the contents of failed sector 132 by XORing the contents of the corresponding sectors on all other disks in parity group 100. Sector data 132 may be reconstructed on the fly each time sector 132 is read, or the reconstructed data may be saved, for example, by recording them in a non-failed sector elsewhere on disk 130, or by reconstructing the entire contents of failed disk 130 on a standby disk as discussed below.

Figure 6:
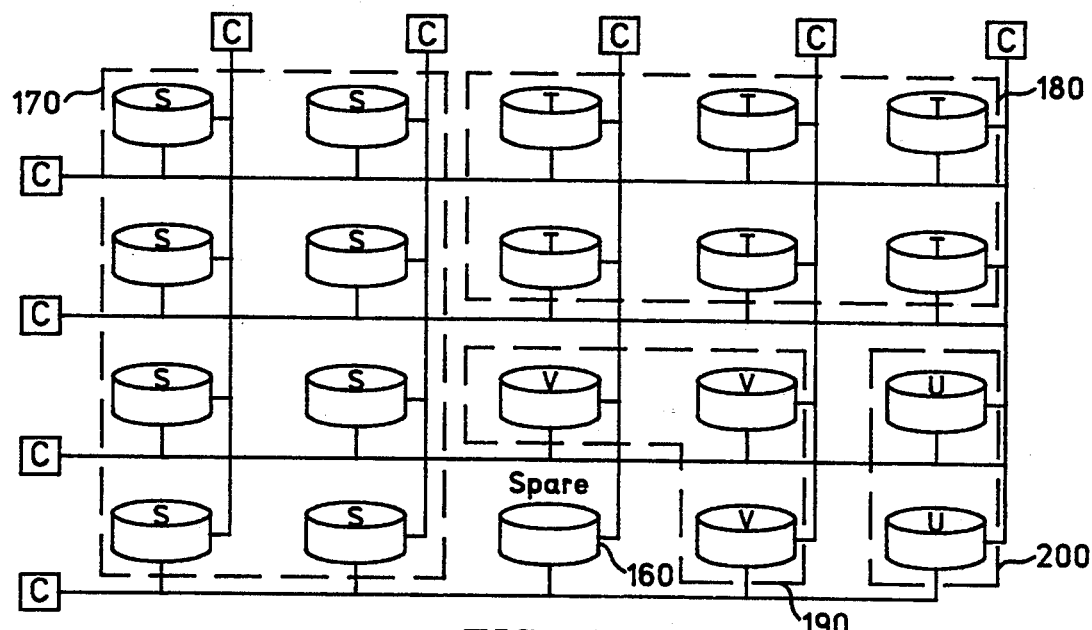
FIG. 6 depicts an alternative embodiment of the data storage array architecture of this invention showing a hot standby disk.

FIG. 6 shows the addition of a standby disk 160 to array 10. Standby disk 160 initially does not belong to any parity group 170, 180. The system manager (not shown) again employs parity/standby user interface 42 (FIG. 4) to select standby disk 160. User interface 42 then alters standby disk table 46, recording there the identity of the newly selected standby disk, in response to user commands.

When array controller 40 receives an "entire-disk" failure indication for disk 130 and standby disk 160 is available, a failover component 52 invokes reconstruction component 50 to reconstruct the entire contents of failed disk 130 and copy it to standby disk 160. Failover component 52 then alters parity group table 44, e.g., noting in that table that standby disk 160 is replacing disk 130. Component 52 further marks the entry for standby disk 160 in standby disk table 46 to indicate that standby disk 160 is in use. Array controller 40 then automatically directs future accesses to failed disk 130 to standby disk 160 in response to these table changes. In this way, recovery from total failure of a single disk is accomplished without manual intervention.

Of course, other control schemes may similarly exploit the advantages and features of the disk array architecture of this invention.

Clearly, other embodiments and modifications of this invention will occur readily to those of ordinary skill in the art in view of these teachings. Therefore, the invention is to be limited only by the following claims, which include all such embodiments and modifications when viewed in conjunction with the above specification and accompanying drawings.

We claim:

1. A data storage subsystem for a computer system, comprising:
    (a) a first plurality of no more than (n*m) disks for storing data, each of said disk containing recorded data, each of said disks being denoted by a pair of index numbers (i,j), and where n and m are predetermined positive integers such that $1 \leq i \leq n$ and $1 \leq j \leq m$;
    (b) a second plurality of at least (n+m) disk controllers for storing data to and receiving data from said disks, each said controller being denoted by an index number k such that $1 \leq k \leq (n+m)$; and
    (c) a third plurality of coupling channel means for coupling said controllers to said disks, said third plurality of coupling channel means being disposed such that each of said disks denoted by said pair of index numbers (i,j) is coupled to said controller denoted by said index number k=(i) and to said controller denoted by said index number k=(n+j).

2. The data storage subsystem of claim 1, further comprising:
    (d) parity group selection means for selecting at least one second plurality of said disks to form at least one parity group;
    (e) failure detection means in each said parity group for detecting and indicating the failure of any said disk in said parity group; and
    (f) reconstruction means coupled to each said parity group for reconstructing data from a first said disk in said parity group by combining data from other said disks in said parity group.

3. The data storage subsystem of claim 2, wherein:
said parity group selection means includes parity disk allocation means for allocating at least one said disk within each said parity group for storage of redundant information.

4. The data storage subsystem of claim 2, wherein:
said parity group selection means includes means for selecting a first and a second parity group, the number of said disks in said first parity group being different from the number of said disks in said second parity group.

5. The data storage subsystem of claim 2, wherein each said disk has a read head for reading data from said disk at a sector position and a write head for storing data onto said disk at a sector position and wherein:
each said disk in said at least one parity group is operated synchronously with all other said disks in said at least one parity group such that said sector positions of all said read heads are substantially equivalent and said sector positions of all said write heads are substantially equivalent in said parity group.

6. The mass storage subsystem of claim 2, further comprising:
    (g) standby designation means for designating at least one said disk as a standby disk; and
    (h) failover means for logically substituting said standby disk for a first said disk in a first said parity group responsive to said failure indication for said first disk.

7. The data storage subsystem of claim 6, wherein:
said parity group selection means includes parity disk allocation means for allocating at least one said disk within each said parity group for storage of redundant information.

8. The data storage subsystem of claim 6, wherein each said disk has a read head for reading data from said disk at a sector position and a write head for storing data onto said disk at a sector position and wherein:
each said disk in said at least one parity group is operated synchronously with all other said disks in said at least one parity group such that said sector positions of all said read heads are substantially equivalent and said sector positions of all said write heads are substantially equivalent in said parity group.

9. The data storage subsystem of claim 6, wherein:
said parity group selection means includes means for selecting a first and a second parity group, the number of said disks in said first parity group being different from the number of said disks in said second parity group.

10. The data storage subsystem of claim 9, wherein:
said parity group selection means includes parity disk allocation means for allocating at least one said disk within each said parity group for storage of redundant information.

11. The data storage subsystem of claim 10, wherein each said disk has a read head for reading data from said disk at a sector position and a write head for storing data onto said disk at a sector position and wherein:
each said disk in said at least one parity group is operated synchronously with all other said disks in said at least one parity group such that said sector positions of all said read heads are substantially equivalent and said sector positions of all said write heads are substantially equivalent in said parity group.

* * * * *